United States Patent [19]
Wilson et al.

[11] Patent Number: 5,221,380
[45] Date of Patent: Jun. 22, 1993

[54] TIRE CHAIN INSTALLATION SUPPORT

[76] Inventors: Delbert M. Wilson, 2311 Mountview Ave. West, Tacoma, Wash. 98466; Sherman E. Wilson, 2521 84th St. East, Tacoma, Wash. 98445

[21] Appl. No.: 808,468

[22] Filed: Dec. 16, 1991

[51] Int. Cl.$^5$ .............................................. B66F 7/28
[52] U.S. Cl. ........................ 152/213 R; 116/28 R; 116/67 R; 116/173; 81/15.8; 254/88
[58] Field of Search ............... 152/213 R; 81/15.8; 254/88; 116/67 R, 28 R, 173

[56] References Cited

U.S. PATENT DOCUMENTS

| | | | |
|---|---|---|---|
| 2,604,802 | 7/1952 | Rhoads et al. | 81/15.8 |
| 3,178,156 | 4/1965 | Rigers | 254/88 |
| 3,187,710 | 6/1965 | Wilfert | 116/67 R |
| 3,952,688 | 4/1976 | Merriman | 116/67 R X |
| 4,103,870 | 8/1978 | Murakami | 152/213 R X |
| 4,194,724 | 3/1980 | Masegian | 254/88 |
| 4,977,400 | 12/1990 | Jeffries | 254/88 X |

OTHER PUBLICATIONS

"Skid Chains", Popular Mechanics, 1941, p. 159.

Primary Examiner—Michael W. Ball
Assistant Examiner—Francis J. Lorin
Attorney, Agent, or Firm—Leon Gilden

[57] ABSTRACT

A tire chain support includes a first top wall canted relative to a second top wall defining an obtuse angle therebetween, wherein the second top wall extends from a forward distal end of side walls of the support to define an upwardly extending ramp directed to the top wall. Spaced parallel ribs define spaced slots therebetween to receive the tire chain mesh in an array aligning the array relative to the tire permitting proper alignment and positioning of the tire chain for securement relative to the tire. A modification of the invention includes an audible alarm arranged for actuation upon proper orientation of the tire relative to the support and to further include an alignment telescoping leg structure for properly orientating the vehicle relative to the support structure.

2 Claims, 4 Drawing Sheets

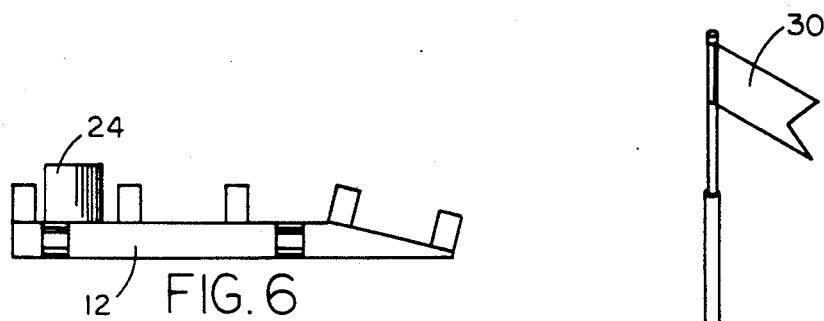
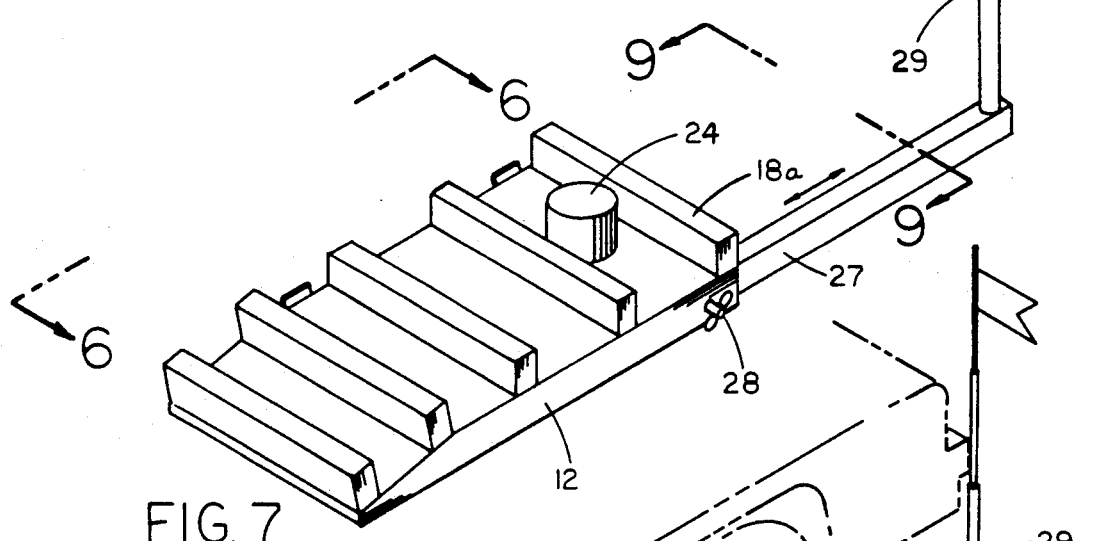
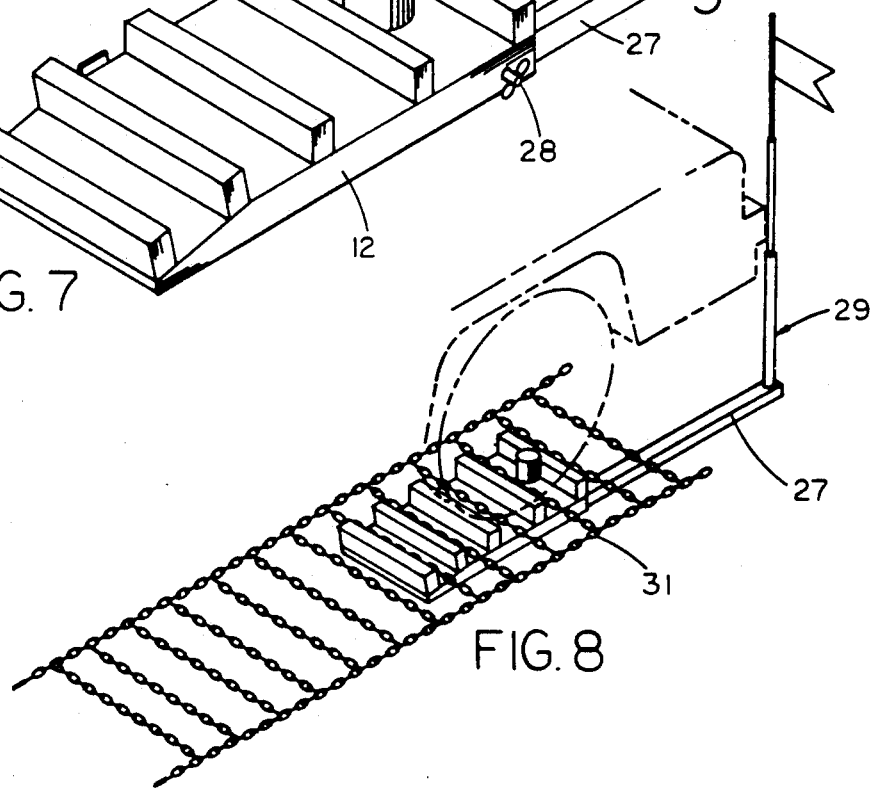

TIRE CHAIN INSTALLATION SUPPORT

BACKGROUND OF THE INVENTION

1. Field of the Invention

The field of invention relates to tire chain apparatus, and more particularly pertains to a new and improved tire chain installation support wherein the same is arranged for the proper positioning and alignment of a vehicular tire relative to an underlying tire chain assembly web.

2. Description of the Prior Art

Tire chains of various types are utilized throughout the prior art to assist in the maneuverability of vehicles relative to snow conditions. Various tire chain installation tools have been utilized such as illustrated in U.S. Pat. No. 4,703,675 to Dalaba wherein "U" shaped legs are mounted relative to one another for securement relative to an associated tire.

U.S. Pat. No. 4,513,800 to Vossenkemper sets forth a tire chain mounting device wherein a tire is positioned to a block-like structure formed with a loop pivotally mounted adjacent a rear distal end of the block member.

U.S. Pat. No. 4,966,211 to Tsai-chuan and U.S. Pat. No. 4,376,457 to Guenther sets forth examples of tire chain structures.

Accordingly, it may be appreciated that there continues to be a need for a new and improved tire chain installation support as set forth by the instant invention which addresses both the problems of ease of use as well as effectiveness in construction for the mounting and positioning of tire chains relative to an associated vehicular tire.

SUMMARY OF THE INVENTION

In view of the foregoing disadvantages inherent in the known types of tire chain apparatus now present in the prior art, the present invention provides a tire chain installation support wherein the same is arranged for the proper positioning and alignment of a tire chain mesh relative to a vehicular tire. As such, the general purpose of the present invention, which will be described subsequently in greater detail, is to provide a new and improved tire chain installation support which has all the advantages of the prior art tire chain apparatus and none of the disadvantages.

To attain this, the present invention provides a tire chain support including a first top wall canted relative to a second top wall defining an obtuse angle therebetween, wherein the second top wall extends from a forward distal end of side walls of the support to define an upwardly extending ramp directed to the top wall. Spaced parallel ribs define spaced slots therebetween to receive the tire chain mesh in an array aligning the array relative to the tire permitting proper alignment and positioning of the tire chain for securement relative to the tire. A modification of the invention includes an audible alarm arranged for actuation upon proper orientation of the tire relative to the support and to further include an alignment telescoping leg structure for properly orientating the vehicle relative to the support structure.

My invention resides not in any one of these features per se, but rather in the particular combination of all of them herein disclosed and claimed and it is distinguished from the prior art in this particular combination of all of its structures for the functions specified.

It is therefore an object of the present invention to provide a new and improved tire chain installation support which has all the advantages of the prior art tire chain apparatus and none of the disadvantages.

It is another object of the present invention to provide a new and improved tire chain installation support which may be easily and efficiently manufactured and marketed.

It is a further object of the present invention to provide a new and improved tire chain installation support which is of a durable and reliable construction.

An even further object of the present invention is to provide a new and improved tire chain installation support which is susceptible of a low cost of manufacture with regard to both materials and labor, and which accordingly is then susceptible of low prices of sale to the consuming public, thereby making such tire chain installation supports economically available to the buying public.

Still yet another object of the present invention is to provide a new and improved tire chain installation support which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an orthographic side view of the invention, as set forth in FIG. 7.

FIG. 7 is an isometric illustration of a further modification of the invention.

FIG. 8 is an isometric illustration of the modified aspect of the invention as set forth in FIG. 7 in operative orientation relative to a vehicle.

DESCRIPTION OF THE PREFERRED EMBODIMENT

Figure 1:
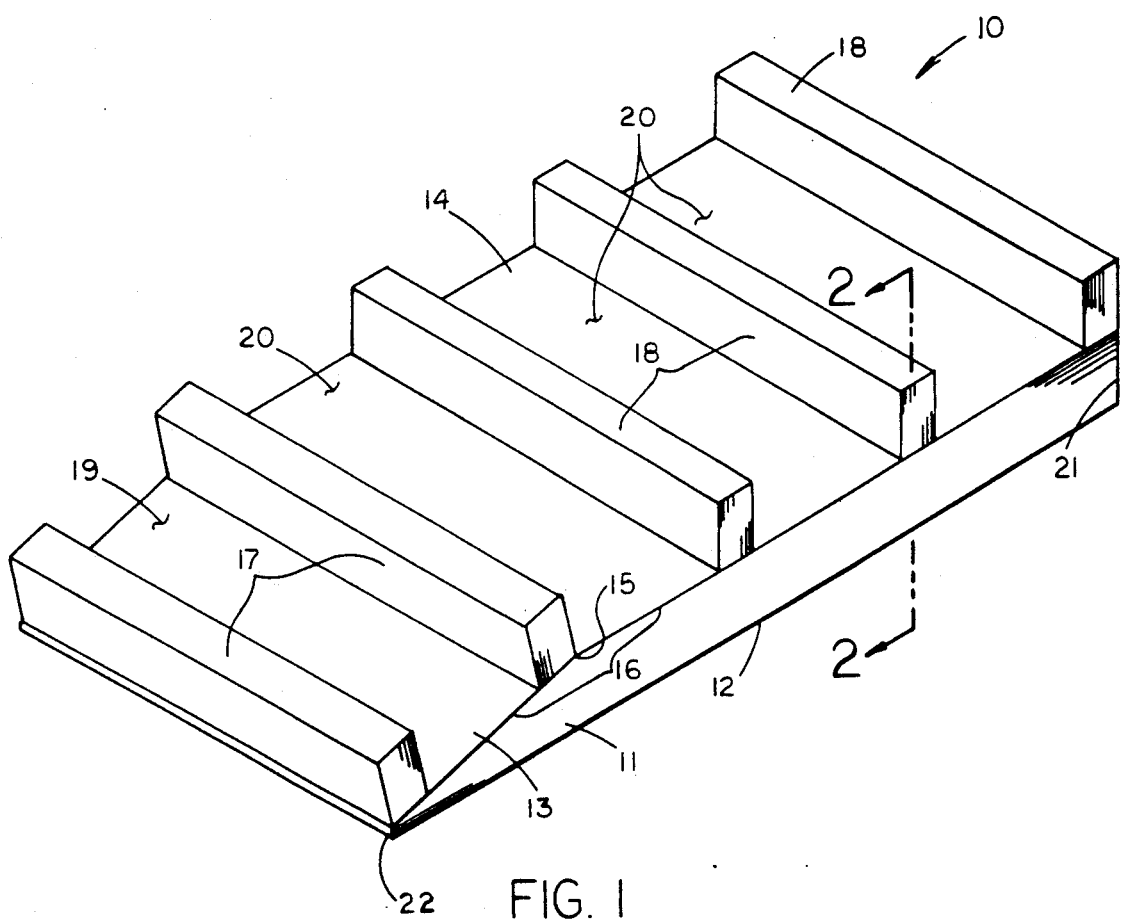
FIG. 1 is an isometric illustration of the instant invention.
Figure 2:
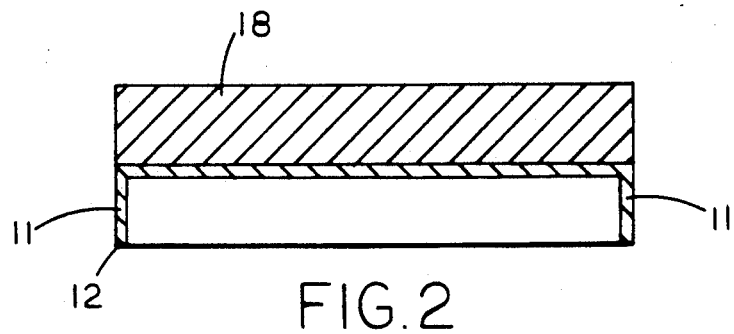
FIG. 2 is an orthographic view, taken along the lines 2—2 of FIG. 1 in the direction indicated by the arrows.
Figure 3:
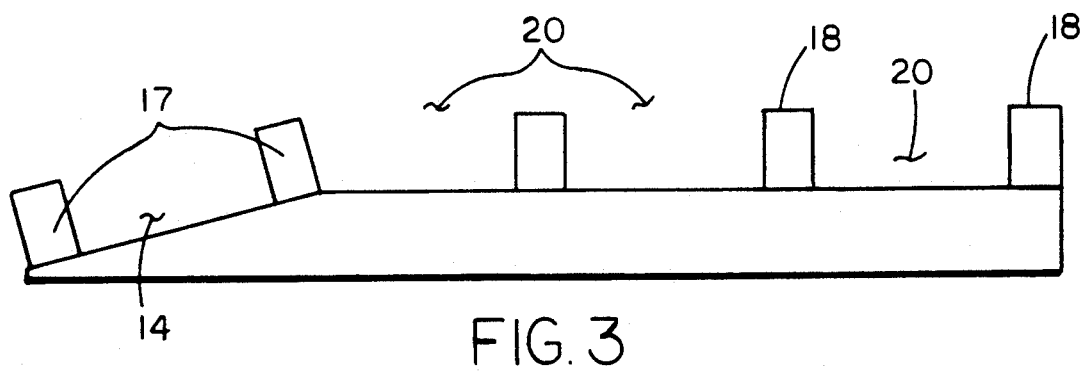
FIG. 3 is an orthographic side view of the instant invention.

With reference now to the drawings, and in particular to FIGS. 1 to 9 thereof, a new and improved tire chain installation support embodying the principles and concepts of the present invention and generally designated by the reference numerals 10 and 10a will be described.

More specifically, the tire chain installation support 10 of the instant invention essentially comprises spaced parallel trapezoidal side walls 11, including a forward end 22 spaced from a side wall rear edge 21 that is orthogonally oriented relative to a side wall base edge 12. A first top wall 13 extending from each side wall forward end 22 extends upwardly relative to the base edge 12 joined to a second top wall 14 that is oriented parallel relative to the base edge 12, wherein the second top wall extends to the side wall rear edge 21. An obtuse angle 16 is defined as included between the first and second top walls 13 and 14. The top wall extension 15 is thusly defined at the joining of the first top wall 13 relative to the second top wall 14. A plurality of first ribs 17 are orthogonally mounted in a parallel relationship on the first top wall 13, wherein a first of said ribs is arranged coextensively and contiguously with the side wall forward ends 22, with a second first rib 17 arranged coextensively along a top wall extension 15. A plurality of second ribs 18 extend in a parallel relationship relative to the first ribs along the second top wall 14. In this manner, a first slot 19 is defined between the first ribs 17 and the second slots 20 defined between the second ribs 18 and one of said second ribs and a further one of said first ribs 17 extending along the top wall extension 15. The slots 19 and 20 are thusly arranged to receive a chain assembly web 31, as exemplified in FIG. 8.

Figure 4:
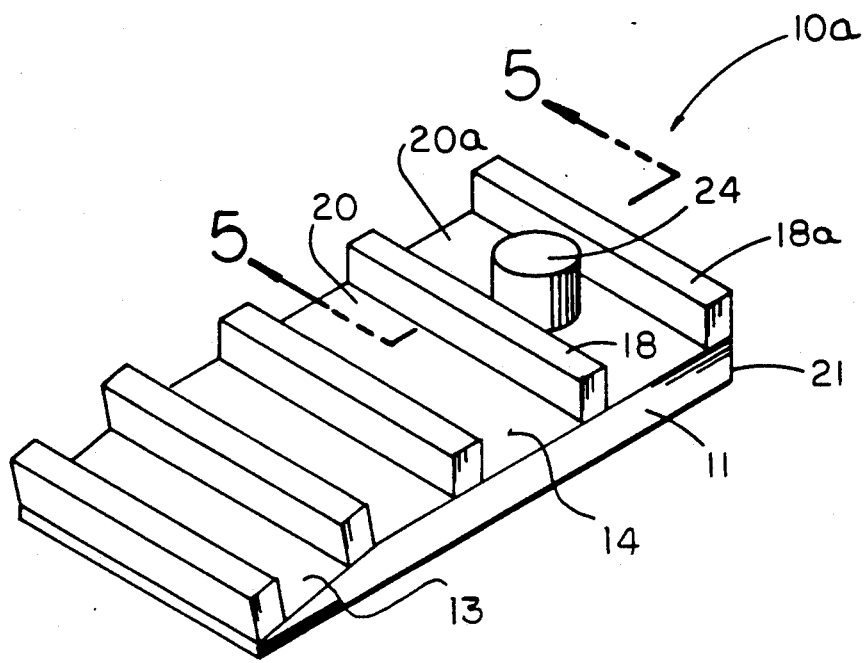
FIG. 4 is an isometric illustration of a modification of the invention.
Figure 9:
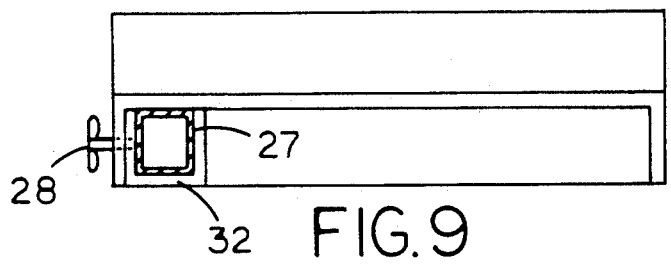
FIG. 9 is an orthographic view, taken along the lines 9—9 of FIG. 7.
Figure 5:
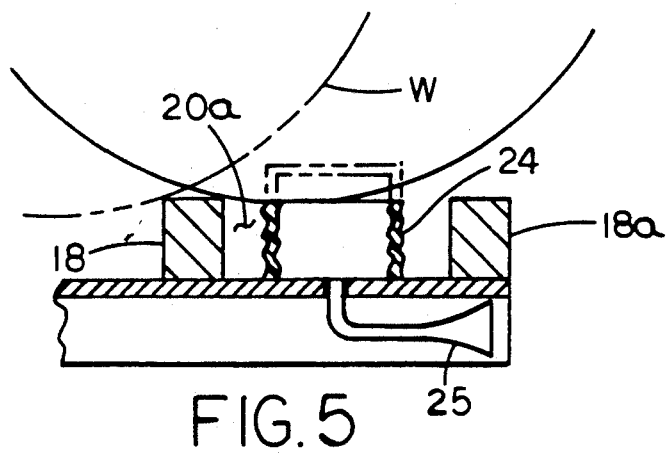
FIG. 5 is an orthographic view, taken along the lines 5—5 of FIG. 4 in the direction indicated by the arrows.

The support 10a (a further embodiment), as illustrated in FIGS. 4, 5, and 8 for example, utilizes a compressible bellows 24 mounted in a last slot 20a between a side wall rear edge second rib 18a that is mounted coextensively with a rear edge of the second top wall 14 and an adjacent second rib, wherein the compressible bellows is in pneumatic communication below the second top wall 14 with an audible air horn 25, whereupon a vehicular wheel "W" compressing the bellows 24 effects audible actuation of the horn 25 to audibly indicate proper orientation of the wheel "W" of the associated vehicle, in a manner as illustrated in the FIGS. 5 and 8. Further FIG. 9, as required, a telescoping tube 27 is slidably mounted from below the second top wall 14 from an associated tubular support sleeve 32, wherein a lock rod 28 orthogonally directed through one of said side walls 12 permits selective locking of the telescoping tube 27 relative to the side wall 12 underlying the floor 14. A telescoping post assembly 29 is mounted orthogonally relative to an outer distal end of the telescoping tube 27, with a flag member 30 mounted at an upper distal end of the telescoping post assembly 29 for proper visual indication of orientation of the vehicle, whereupon proper positioning of the vehicle relative to the telescoping post assembly 29 provides for visual indication of the proper positioning of the vehicle relative to the underlying support structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tire chain installation support, comprising,
   a plurality of spaced parallel trapezoidal support side walls arranged coextensively relative to one another, wherein each side wall includes a forward end spaced from a side wall rear edge, and
   the side walls each include an elongate side wall base edge extending longitudinally relative to the side wall forward end and orthogonally intersecting a lower distal end of the side wall rear edge, and
   a first top wall extending from each forward end of each side wall defining an acute angle between the first top wall and the side wall base edge of said each side wall, and the side wall first top wall intersecting a second top wall at a top wall intersection, and the second top wall extending from the top wall intersection rearwardly to an upper distal end of each side wall rear edge of each side wall, wherein the first top wall and the second top wall define an obtuse angle included between the first top wall and the second top wall, and
   a plurality of first parallel ribs are mounted to the first top wall, and a plurality of second parallel ribs are mounted to the second top wall, wherein a first slot is defined between the first parallel ribs, and a plurality of second slots are defined between the second parallel ribs, and
   the second parallel ribs include a last rib in contiguous communication with the side wall rear edge of each of said side walls and a last slot is arrayed between said last rib and an adjacent one of said second parallel ribs, and a compressible bellows is mounted within said last slot, the bellows arranged in a spaced relationship between the last rib and an adjacent second rib, and the bellows in pneumatic communication through the top wall, with an audible air horn, the audible air horn mounted between the side walls below the second top wall, and wherein the top of the bellows is oriented above the last rib and the second ribs in a first orientation and compressed to a second deflected orientation when a tire wheel is oriented above the bellows to indicate proper orientation of the tire wall relative to the second slots.

2. An apparatus as set forth in claim 1 including a tubular support sleeve mounted below the second top wall, the tubular support sleeve telescopingly mounting a telescoping tube, the telescoping tube extending rearwardly and longitudinally of the second top wall, wherein the telescoping tube includes a telescoping post assembly orthogonally mounted to an outer distal end of the telescoping tube spaced from the second top wall, and a flag member mounted to an upper distal end of the telescoping post assembly, and a lock rod orthogonally directed through one of said side walls into communication with said telescoping tube to fixedly position the telescoping tube relative to the second top wall.

* * * * *